United States Patent [19]
Uhl

[11] 3,880,300
[45] Apr. 29, 1975

[54] APPARATUS FOR DISTRIBUTING PARTICULATE MATERIAL OVER A ZONE

[75] Inventor: George A. Uhl, Markham, Ill.
[73] Assignee: Atlantic Richfield Company, Los Angeles, Calif.
[22] Filed: Mar. 28, 1974
[21] Appl. No.: 455,704

[52] U.S. Cl. ......... 214/17 CB; 23/288 R; 222/411; 239/684; 239/687
[51] Int. Cl. ........................................... B65g 65/32
[58] Field of Search ......... 239/650, 665, 666, 681, 239/682, 684, 687–689; 222/410, 411; 214/17 CB; 23/288 R, 288 A, 288 G

[56] References Cited
UNITED STATES PATENTS

| | | | |
|---|---|---|---|
| 3,064,833 | 11/1962 | Von Ruden | 239/684 X |
| 3,305,108 | 2/1967 | Edming | 214/17 CB |
| 3,361,258 | 1/1968 | Kalke | 214/17 CB X |
| 3,371,870 | 3/1968 | Harrer | 239/687 X |
| 3,430,788 | 3/1969 | Edming | 214/17 CB |
| 3,804,273 | 4/1974 | Uhl | 214/17 CB |

Primary Examiner—M. Henson Wood, Jr.
Assistant Examiner—Andres Kashnikow
Attorney, Agent, or Firm—Frank J. Uxa

[57] ABSTRACT

An improved apparatus for distributing particulate materials over a zone wherein the apparatus is not centrally located with respect to the zone comprising a supply hopper, having an inlet and an outlet, for holding particulate material; a rotatable shaft adapted for connection to a motor to be rotated thereby;; and a distributor element supported by the shaft for rotating therewith adjacent the supply hopper outlet wherein the distances between the different points of the supply hopper outlet and the distributor element are varied in a predetermined pattern so that the particulate material is substantially uniformly distributed over the cross-section of the zone.

15 Claims, 6 Drawing Figures

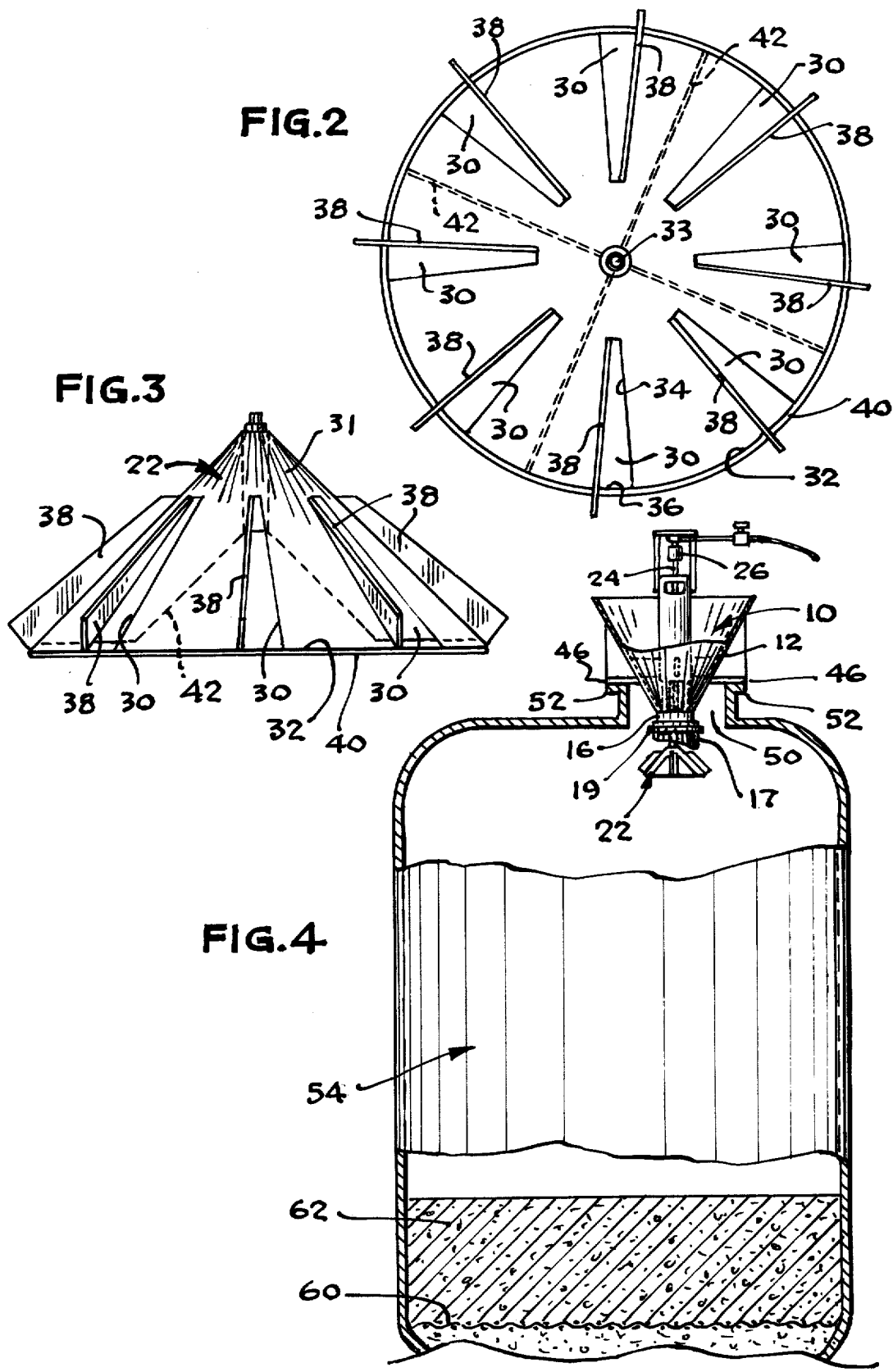

APPARATUS FOR DISTRIBUTING PARTICULATE MATERIAL OVER A ZONE

The present invention pertains to a particle distributor. More particularly, the present invention pertains to an apparatus for distributing particulate material, such as a catalyst, over a zone, such as a catalytic reactor.

In U.S. Pat. application, Ser. No. 263,535, now U.S. Pat. No. 3,804,273, an improved apparatus for distributing particulate material, such as catalyst particles is disclosed. The present invention relates to a further improvement of such an apparatus.

In many instances, because of the configuration of the zone into, i.e., over which particulate material is to be distributed, it is either impossible or at least impractical to centrally locate the distribution apparatus. As used herein, the term "zone" refers to that volume or space into or over which particulate material is to be distributed. When the distribution apparatus is not centrally located, the particulate material distributed thereby may not be uniformly distributed over the cross-section of the zone. This is disadvantageous since substantially uniform distribution of the particulate matter over the cross-section of the zone is desired.

Therefore, one of the objects of the present invention is to provide an apparatus for distributing particulate solid material, e.g., catalyst, over a zone, e.g., reaction zone.

Another object of the present invention is to provide an apparatus for distributing particulate solid material substantially uniformly over the cross-section of the zone when such apparatus is not centrally located. Other objects and advantages of the present invention will become apparent hereinafter.

As improved apparatus for distributing particulate material over a zone has now been found. In accordance with the present invention, the distribution apparatus, which is not centrally located, i.e., the distances between the apex of the cone, described hereinafter, and at least two (2) points of equal latitude on the sidewalls of the zone over which the particulate material is to be distributed are not equal, comprises:

a supply hopper, having an inlet and an outlet, for holding particulate material, a rotatable shaft adapted for connection to a motor to be rotated thereby; and a distributor element supported by the shaft for rotation therewith adjacent the supply hopper outlet so that at least a portion of the particulate material leaving the supply hopper outlet comes in contact with the distributor element. The distributor element has a substantially conical configuration, preferably, a symmetrical circular conical configuration, with the apex of the cone adjacent the supply hopper outlet, and has a plurality of vertically disposed deflection fins extending radially on the exterior sloped surface of the cone and, preferably, also a plurality of slots extending substantially vertically upward from this sloped surface. The distance between different points of the supply hopper outlet and the apex of the cone varies in a predetermined pattern so that the particulate material is substantially uniformly distributed over the cross section of the zone. As the distributor element is rotated, a portion of the particulate material leaving the supply hopper outlet comes in contact with the exterior sloped surface of the conical distributor element to be deflected radially therefrom and another portion of the particulate material leaving the supply hopper comes in contact with the deflection fins to be deflected tangentially thereby.

It is preferred that the conical distributor element of the present apparatus have a symmetrical circular configuration. That is, preferably, the base of the conical distributor element is circular and the apex of the cone is directly above the center of this circle.

Although the present apparatus is useful in distributing any solid particulate material over a zone, it is particularly adapted to distributing solid catalyst particles into or over a reactor, e.g., chemical reactor. In certain instances, one structure, e.g., reactor, may include two or more zones over which solid particulate material, e.g., catalyst is to be distributed. This situation may result from, for example, internal partition of the space within the structure into distinct zones, or the presence of internal hardware which form obstructions and thus, restrict the solid particulate material from being distributed over the entire cross-section of the structure from a single point. In these instances, the position of the present apparatus can be adjusted or more than one of such apparatus can be employed to provide substantially uniform distribution of solid particulate material over each of the zones included in the structure.

The zone over which solid particulate material is to be distributed may have any cross-section configuration, e.g., circular, square, rectangular, elliptical, etc. In each instance where this cross-sectional configuration is other than circular, the present apparatus is not centrally located. Even if the zone has a circular cross-sectional configuration, the distribution apparatus may be not centrally located.

The pattern of variance of the distances between the apex of the cone and different points on the supply hopper outlet of the present apparatus is predetermined. These distances are varied because the distribution apparatus is not centrally located. With the distribution apparatus being not centrally located, this apparatus must supply particulate material in a specific uneven pattern in order that this material be substantially uniformly distributed over the cross-section of the zone. Thus, the distances between different points on the supply hopper outlet and the apex of the cone are varied in a predetermined, specific pattern so that varying amounts of particulate material are distributed from different portions of the supply hopper outlet. In general, as the distribution apparatus approaches being centrally located the variance in distances between different points on the supply hopper outlet and the apex of the cone decreases. The overall size and configuration of the distributor element, e.g., size and shape of the fins on the distributor element and the angle of the sloped surface of the cone, as well as the rotational speed are selected depending, for example, on the size of the particulate material to be distributed, the overall distance between the supply hopper outlet and the cone, and the size of the zone over which such material is to be distributed. The apparatus of the present invention is particularly useful in carrying out the process set forth in U.S. Pat. No. 3,668,115.

The apex of the conical configuration of the distributor element is the point at which the exterior sloped surface of the cone, i.e., conical configuration, converges. In certain instances, the conical configuration of the distributor element may be truncated by, for example, the insertion or attaching of the rotatable shaft.

In such a situation, the apex of the cone is defined as the point at which the exterior sloped surface of the cone would converge if allowed to do so.

In accordance with the present invention, the distances between different points on the supply hopper and the apex of the cone can be varied in a number of ways. For example, a skirt, e.g., piece of sheet metal, can be fitted, e.g., clamped, onto at least a portion of the discharge pipe, which preferably has a circular cross-section, of the supply hopper extending in a generally downwardly direction toward the distributor element. In place, the skirt becomes at least a portion of the supply hopper outlet. The skirt is cut, trimmed or otherwise fashioned so that the distances between different points on the outlet of the supply hopper, e.g., bottom of the skirt, and the apex of the conical distributor element vary in a predetermined manner so that the particulate material is substantially uniformly distributed over the cross-section of the zone.

In another highly flexible embodiment of the present invention, a plurality of wires and/or flat rods are fitted, e.g., clamped, onto at least a portion of the discharge pipe of the supply hopper extending in a generally downwardly direction toward the conical distributor element. Each of these wires or rods preferably have an outside diameter in the range from about 1/8 inch. to about 1 inch. or more, and are preferably bent at a point above that at which the wire or pipe is fitted, e.g., clamped, to the discharge pipe. This bend is to prevent the wire or rod from unintentionally slipping downwardly into the rotating distributor element. As with the skirt above, these wires or rods, when in place, become at least a portion of the supply hopper outlet. The vertical position of these rods is adjusted so that the distances between different points on the outlet of the supply hopper, e.g., bottom of the wire or rods, and the apex of the conical distributor element vary in a predetermined manner. The vertical position of one or more of the wires or rods can be easily adjusted so that the pattern of particulate material distribution can be altered, if necessary, to insure that the particulate material is substantially uniformly distributed over the cross-section of the zone.

These and other aspects and advantages of the present invention are set forth in the following detailed description and claims, particularly when considered in conjunction with the accompanying drawings in which like parts bear like reference numerals. In the drawings:

FIG. 2 is a plan view of the distributor element of the particulate distributor depicted in FIG. 1 and is taken along line 2—2 of FIG. 1;

FIG. 3 is an elevational view of the distributor element of FIG. 2;

FIG. 4 is a sectional elevational view illustrating utilization of a particulate distributor in accordance with the present invention to distribute catalyst material within a catalytic reactor.

Figure 1:
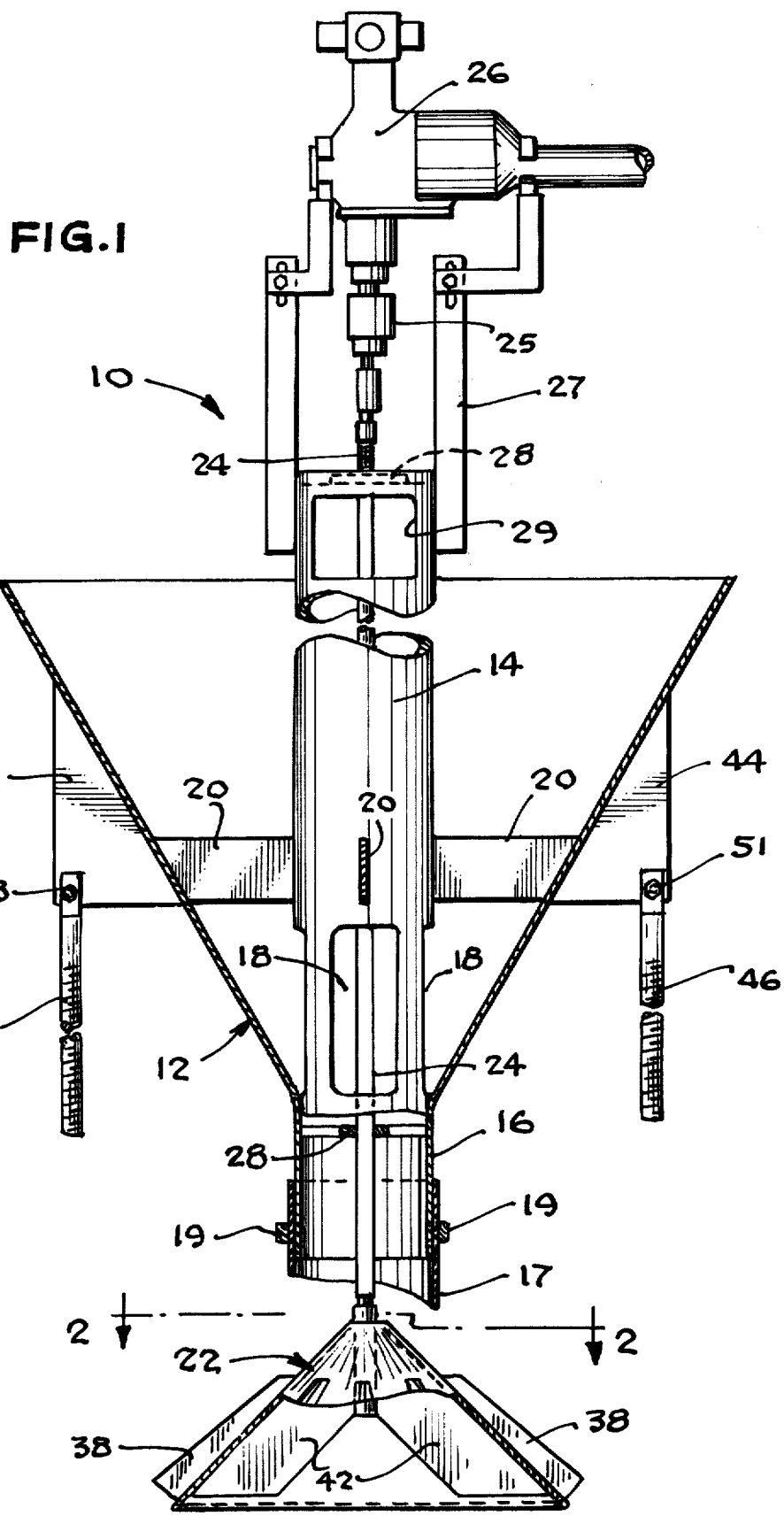
FIG. 1 is a partially broken, sectional elevational view of a particulate distributor in accordance with the present invention.

Particulate distributor 10 depicted in FIG. 1 includes supply hopper 12 which, for example, can be made of a sheet metal and can have a substantially frustoconical shape, being larger at the upper end. A vertical pipe 14 extends centrally within supply hopper 12 and passes through the hopper outlet to form discharge pipe 16. Within the lower portion of hopper 12 a plurality of openings 18 are formed in pipe 14 to provide communication from supply hopper 12 to discharge pipe 16. Skirt member 17 is fitted to discharge pipe 16 by means of clamp 19. Skirt member 17 can be made of any material of construction, e.g., sheet metal, reinforced fiber glass, rubber, synthetic polymers and the like. The bottom of skirt member 17 is the outlet of the supply hopper 12. The skirt member 17 is cut, trimmed or otherwise fashioned so that the distances between different points on the bottom of the skirt member 17 and the apex of cone 22 vary in a predetermined manner so that the particulate material is substantially uniformly distributed over the cross-section of the zone, for example, the reactor 54 depicted in FIG. 4.

Preferably, a plurality of supports 20 are provided to brace pipe 14 within hopper 12. The hopper 12 can be made of any desired capacity or can have removable extension for its sides to increase its capacity. The upper end of the hopper 12 can have a square cross-section or a circular cross-section. The capacity extension for the hopper can be mounted vertically or tangentially.

Conical distributor element 22 is provided adjacent the bottom of skirt member 17 with the cone apex being in a generally upward direction. Distributor element 22 is coupled by shaft 24 which extends within pipe 14, to variable speed motor 26 which is supported above pipe 14 by mounting members 27. By way of example, motor 26 can be a variable speed electric motor or a variable speed pneumatic motor. Shaft 24 is journaled within pipes 14 and 16 by bearing assemblies 28 which permit rotation of shaft 24 within pipes 14 and 16 and which permit longitudinal movement of shaft 24 within bearing assemblies 28. Access to lower bearing assembly 28 may be available through openings 18 and to upper bearing assembly 28 through openings 29 in pipe 14.

As seen in FIGS. 2 and 3, distributor element 22 has a substantially symmetrical circular conical configuration with a plurality of slots 30 extending on the cone sloped surface 31 from the cone lower edge 32 a substantial distance toward the cone apex 33. Each slot 30 can be formed by a first cut 34 extending substantially radially on sloped surface 31, as seen particularly in FIG. 2, and a second cut 36 extending substantially circularly. The resulting fin 38 is folded outwardly to extend from the exterior conical surface 31 in a substantially vertical orientation. Alternatively, the material from the slots 30 can be completely removed and fins of other sizes attached to sloped surface 31. Preferably, distributor element 22 is reinforced, for example, by means of a wire or rod 40 extending around its lower periphery 32 and by means of one or more ribs 42.

Preferably, motor 26 is connected to rotatable shaft 24 by means permitting longitudinal adjustment of shaft 24 relative to motor 26 and thus adjustment of the distance at which distributor element 22 is positioned from the bottom of skirt member 17. This permits a degree of control of the gross rate at which particulate material is distributed by the apparatus. By way of example, shaft 24 can mate with chuck 25 on motor 26 by means of a keyed spline permitting relative longitudinal movement between motor 26 and shaft 24 but requiring shaft 24 to rotate with motor 26.

FIG. 4 illustrates operation of a particulate material distributor to distribute catalyst in a catalytic reactor in accordance with the present invention. Particulate distributor 10 is not centrally located. Thus, in FIG. 4, the distance from the apex of cone 22 to a point on the left sidewall of reaction 54 is greater than the distance from this apex to a point of equal latitude on the right sidewall of reactor 54. Distributor 10 is positioned to discharge catalyst through catalyst inlet 50 in the upper surface 52 of catalytic reactor 54. For this purpose particulate distributor 10 is provided with a plurality of support flanges 44 each of which may be equipped with a mounting bolt 46 to mount particulate distributor 10 to upper surface 52. Support flanges 44 also can be set directly on upper surface 52 with shims utilized to level hopper 12. As seen in FIG. 1, bolts 46 are connected to flanges 44 by means such as bolts 51 and nuts 53. Catalytic reactor 54 is of a cylindrical configuration, having a catalyst inlet 50 in its upper area. The fact that the axis of catalyst inlet 50 is not coincident with the axis of reactor 54 leads to distributor 10 not be centrally located with respect to reactor 54. Reactor 54, for example, can include a support screen 60 to support catalyst material 62 a short distance above the lower surface of the reactor. Consequently, when the reactor 54 is in use, generally downwardly flowing reactant enters through, for example, the catalyst inlet 50, passes through catalyst material 62 and exits reactor 54 through a fluid outlet (not shown) at or near the lower surface of reactor 54.

To charge reactor 54 with catalyst by means of particulate distributor 10, a quantity of the catalyst material is provided to supply hopper 12, and motor 26 is activated to rotate distributor element 22. Catalyst flows from supply hopper 12 through discharge pipe 16 out of the bottom of skirt member 17 which defines an initial discharge path directing the catalyst material generally toward distributor element 22. Some of this catalyst passes through slots 30 to the area of the reactor 54 directly below distributor element 22. Other of the catalyst comes in contact with the conical surface of distributor element 22 and slides in a radial path from the conical distributor element 22. Still other catalyst comes in contact with the fins 38 which impart a tangential component to its movement. The distances between different points on the bottom of skirt member 17 and the apex of cone 22 vary in a predetermined pattern so that the catalyst is substantially uniformly distributed over the cross-section of reactor 54. To illustrate, in FIG. 4, the shape of the bottom of skirt member 17 with respect to the apex of cone 22 is such that proportionately more catalyst will be discharged to the area left of the distributor 10 than to the area right of the distributor 10. Accordingly, catalyst material is distributed substantially uniformly across the cross-section of reactor 54. The distribution of catalyst can further be controlled by controlling the speed of rotation of distributor element 22 and the height of the distributor element above the catalyst bed. If desired, discharge pipe 16 and shaft 24 can incorporate one or more detachable extensions to permit positioning of distributor element 22 further within reactor 54, for example, in the event the reactor inlet includes a long neck.

With the apparatus of the present invention, catalyst can be charged generally downwardly in reactor 54. Typically, reactors ranging in size from between about 1 to about 15 feet, preferably from about 3 to about 13 feet in diameter, and from about 5 to about 125 feet, more preferably from about 10 to about 70 feet, in length can be charged by the apparatus of the present invention. The catalyst is preferably charged to the reactor at a rate of fill of the reactor of up to about 17 vertical inches per minute, more preferably from about 1 to about 6 and still more preferably, from about 2 to about 4 inches per minute. The rate of fill of the reactor can be nonuniform, that is, the rate of fill can vary within the above range. It is preferred, however, that the rate of fill be uniform and that after a given rate of fill is established, that this rate of fill be maintained while adding particulate material to the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably, an average free fall distance of from about 5 to about 125 feet and still more preferably, from about 10 to about 70 feet. The gaseous medium in general is air, or depending on the catalyst, an inert medium such as nitrogen. In general, the minimum free fall distance provides for a downward velocity sufficient to orient the catalyst particle along the major axis of the catalyst particle, that is the free fall distance should be sufficient to provide for the catalyst particle to move a slight vertical distance upwardly after contact with the catalyst surface in order to accomplish the orientation. Thus, in general, the catalyst particles fall individually to the catalyst surface as the catalyst bed is formed. The orientation of the catalyst particle produced in this manner provides for the substantially horizontal orientation of the catalyst particles on an average basis in that the most probable orientation of the longitudinal axis of catalyst particles is horizontal. In addition, catalyst particles having a substantially horizontal orientation are defined herein to provide a catalyst surface which has a difference between the highest portion of the catalyst surface and the lowest portion of the catalyst surface which is less than 10% of the diameter of the catalyst bed, that is a substantially flat surface more preferably less than 5% and still more preferably less than 1%.

A wide variety of solid catalysts can be distributed with the apparatus of this invention, for example, oxidation, hydrodesulfurization, hydrocracking, cracking, reforming and hydrogenation catalysts. Typical examples of hydrodesulfurization catalysts comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example, the oxides or sulfides of molybdenum, tungsten, iron, cobalt, nickel, chromium and the like. Vanadium compounds may also be employed in some cases. A particularly active combination consists of a Group VIB metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be suspended on a suitable adsorbent oxide carrier such as alumina, silica zirconia, thoria, magnesia, titania, bauxite, acid-activated clays, or any combination of such materials.

Typical examples of hydrocracking catalysts are crystalline metallic alumino-silicate zeolite, having a platinum group metal, e.g., platinum or palladium, deposited thereon or composited therewith. These crystalline zeolites are character by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15A units, preferably about 8 to 15A units, when composited with the platinum group metal, and particularly after base exchange to reduce the alkali metal oxide, e.g., $Na_2O$, content of the zeolite to less than about 10 weight percent, are effective hydrocracking catalysts.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt, or nickel) be present in mixture with an oxide or sulfide or a Group VIB metal (preferably molybdenum or tungsten). Suitable carriers or supports include acidic supports such as silica-alumina, silica-magnesia, and other well-known cracking catalyst bases; the acidic clays; fluorided alumina; and mixtures of inorganic oxides, such as alumina, silica, zirconia, and titania, having sufficient acidic properties providing high cracking activity.

In addition, the various metals and metal oxides and sulfides can be utilized on a mixture of support materials. Thus, for example, a zeolite and an alumina can be blended together as a support material in varying proportions which support materials contain various metals deposited thereon.

Typical examples of cracking catalysts are the well-known commercial varieties, e.g., Davison XZ-25, Aerocat Triple S-4, Nalcat KSF, Houdry HZ-1, etc. These catalysts are made up of a silica-alumina-zeolite base in particle sizes usually within a size range of one thirty-second to three-eights inch, suitable one-sixteenth to one-eighth inch, and containing rare earth metal oxides.

Typical compositions of the catalysts are the following. Davison XZ-25, a product of Davison Chemical Company, is mixed silica-alumina-zeolite cracking catalyst containing about 30–35 weight percent alumina, 18 weight percent zeolite X and about 2 weight percent cerium and 1 weight percent lanthanum. Aerocat Triple S-4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina-zeolite cracking catalyst containing about 31–35 weight percent alumina, 11 percent zeolite X, about 1 percent cerium and 0.3 percent lanthanum.

Figure 5:
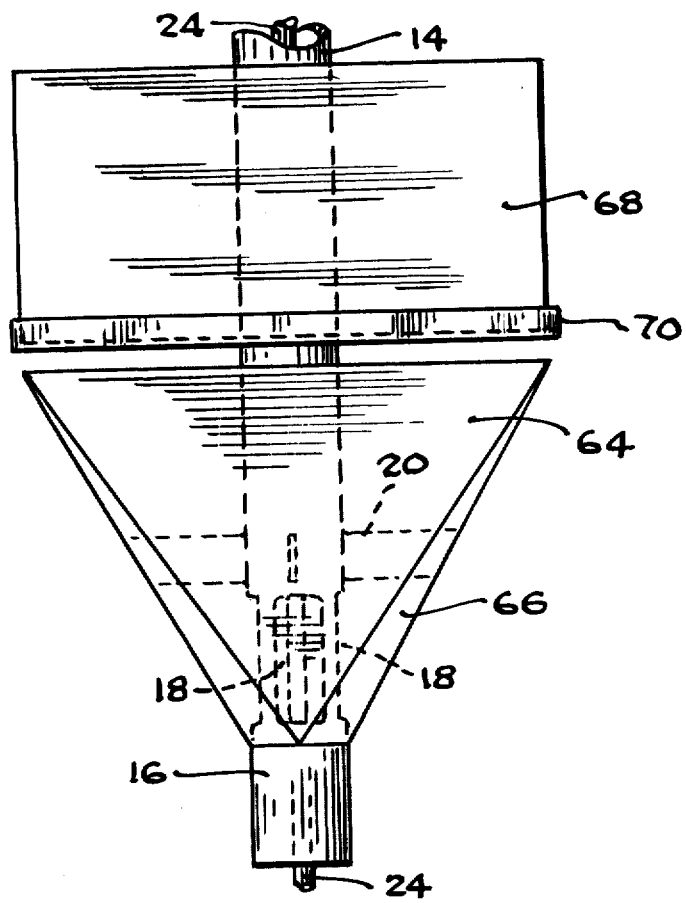
FIGS. 5 and 6 are a side elevational view and a top plan view, respectively, of an alternative embodiment of a particulate distributor in accordance with the present invention.
Figure 6:
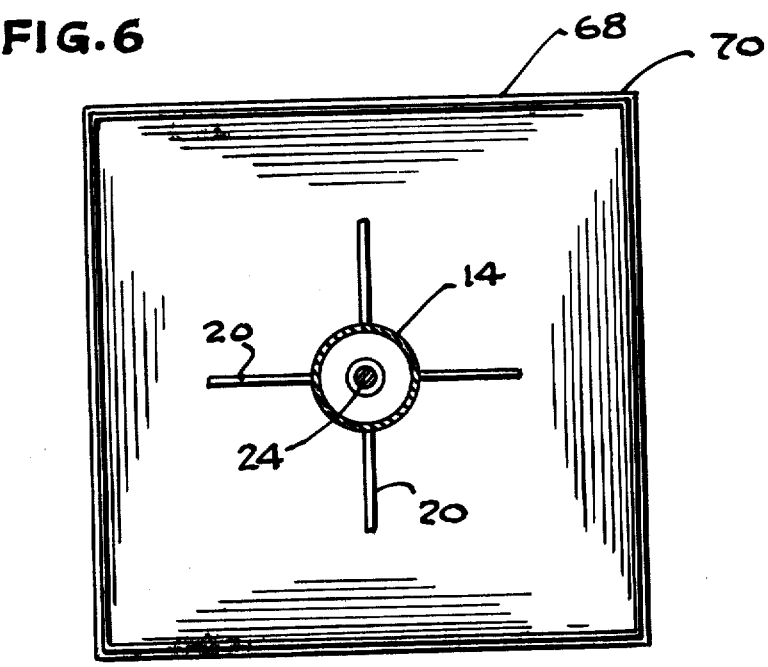

Preferably supply hopper 12 can hold a substantial quantity of particulate material. Such material frequently comes in supply drums, and preferably supply hopper 12 can hold at least one drum of particulate material. Extensions can be added to the sides of supply hopper 12 to increase its capacity while still permitting ready transport and storage. The use of such extensions is facilitated if the upper end of supply hopper 12 has a square cross-section, rather than a circular cross-section. FIGS. 5 and 6 illustrate such a supply hopper 64 with sidewall 66 of a circular cross-section at its lower end to mate with discharge pipe 16 and of a square cross-section at its upper end. Extension 68 is formed with lip 70 to mate with the square upper end of hopper 64.

As a specific example, a particulate distributor in accordance with the present invention can be provided with supply hopper 64 having at its upper end a square cross-section, with each side in the order of 3 feet, and at its lower end a circular cross-section, with a diameter in the order of 6 inches to join discharge pipe 16. The sides of such hopper 66 are inclined at an angle in the order of 30°. Four openings 18 are provided, spaced 90° apart about the lower portion of pipe 14, with each opening 18 having a width in the order of 3 inches and a length in the order of 8 inches. Distributor element 22 can be a cone having its sides inclined at an angle in the order of 45°, with base 32 having a diameter in the order of about 12 to 24 inches. Eight slots 30 and fins 38 can be provided at 45° intervals about distributor element 22, each slot and fin extending in the order of about 4 to 20 inches up the inclined side of element 22 and having a width in the order of ½ inches at base 32. Such a particulate distributor can readily distribute over a zone with a radius in the order of about 3 to 9 feet a particulate material such as a macrosize catalyst having a diameter in the range of from about one sixty-fourth inch to about one fourth inch and a length in the range of from about one thirty-second inch to about one-half inch. Thus, it is seen that the particulate distributor according to the present invention is capable of providing substantially uniform particulate distribution over a zone even though the apparatus is not centrally located with respect to the zone. The present apparatus can be easily adapted, by altering the pattern of variance of the distances between different points on the supply hopper outlet and the apex of the cone, to provide substantially uniform particulate distribution over a zone or zones of essentially any configuration.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. Apparatus for distributing particulate material over a zone, said apparatus being located so that the distances between the apex of a cone, described hereinafter, and at least two points of equal latitude on the sidewalls of said zone are not equal, comprising:

a supply hopper, having an inlet and an outlet, for holding particulate material;

a rotatable shaft adapted for connection to a motor to be rotated thereby; and a distributor element supported by said shaft for rotation therewith adjacent said supply hopper outlet so that at least a portion of said particulate material leaving said supply hopper outlet comes in contact with said distributor element, said distributor element having a substantially conical configuration with the apex of said cone being adjacent said supply hopper outlet and said cone having a plurality of vertically disposed deflection fins extending radially on the exterior sloped surface of the cone, the distances between different points of said supply hopper outlet and the apex of said cone being varied in a predetermined pattern so that said particulate material is substantially uniformly distributed over the cross section of said zone;

whereby as said distributor element is rotated a portion of particulate material leaving said supply hopper outlet comes in contact with the exterior sloped surface of said conical distributor element to be deflected radially therefrom and another portion of said particulate material leaving said supply hopper comes in contact with said deflection fins to be deflected tangentially thereby.

2. The apparatus of claim 1 wherein said distributor element has a symmetrical circular conical configuration.

3. The apparatus of claim 2 wherein said supply hopper has a discharge pipe of circular cross section adjacent to said outlet.

4. The apparatus of claim 3 wherein said distributor element further comprises a plurality of slots extending substantially vertically upward from said sloped surface to provide a pathway for at least a portion of said particulate material from said supply hopper outlet to the area of said zone directly below said apparatus.

5. The apparatus of claim 4 wherein said motor is a variable speed motor.

6. The apparatus of claim 5 wherein at least a portion of said supply hopper outlet comprises the bottom edge of a skirt member mechanically attached to said supply hopper.

7. The apparatus of claim 6 wherein said skirt member is mecanically attached to said discharge pipe.

8. The apparatus of claim 6 wherein said skirt member is constructed of sheet metal.

9. The apparatus of claim 1 further comprising means for adjusting the position of said distributor element relative to said supply hopper outlet.

10. The apparatus of claim 6 wherein said particulate material comprises catalyst and said zone comprises a chemical reaction zone.

11. The apparatus of claim 8 wherein said particulate material comprises catalyst and said zone comprises a chemical reaction zone.

12. The apparatus of claim 9 wherein said particulate material comprises catalyst and said zone comprises a chemical reaction zone.

13. The apparatus of claim 1 wherein said particulate material comprises catalyst and said zone comprises a chemical reaction zone.

14. The apparatus of claim 4 wherein said particulate material comprises catalyst and said zone comprises a chemical reaction zone.

15. The apparatus of claim 5 wherein said particulate material comprises catalyst and said zone comprises a chemical reaction zone.

* * * * *